2,935,040
VISIBLE FILTER CLOGGING INDICATOR

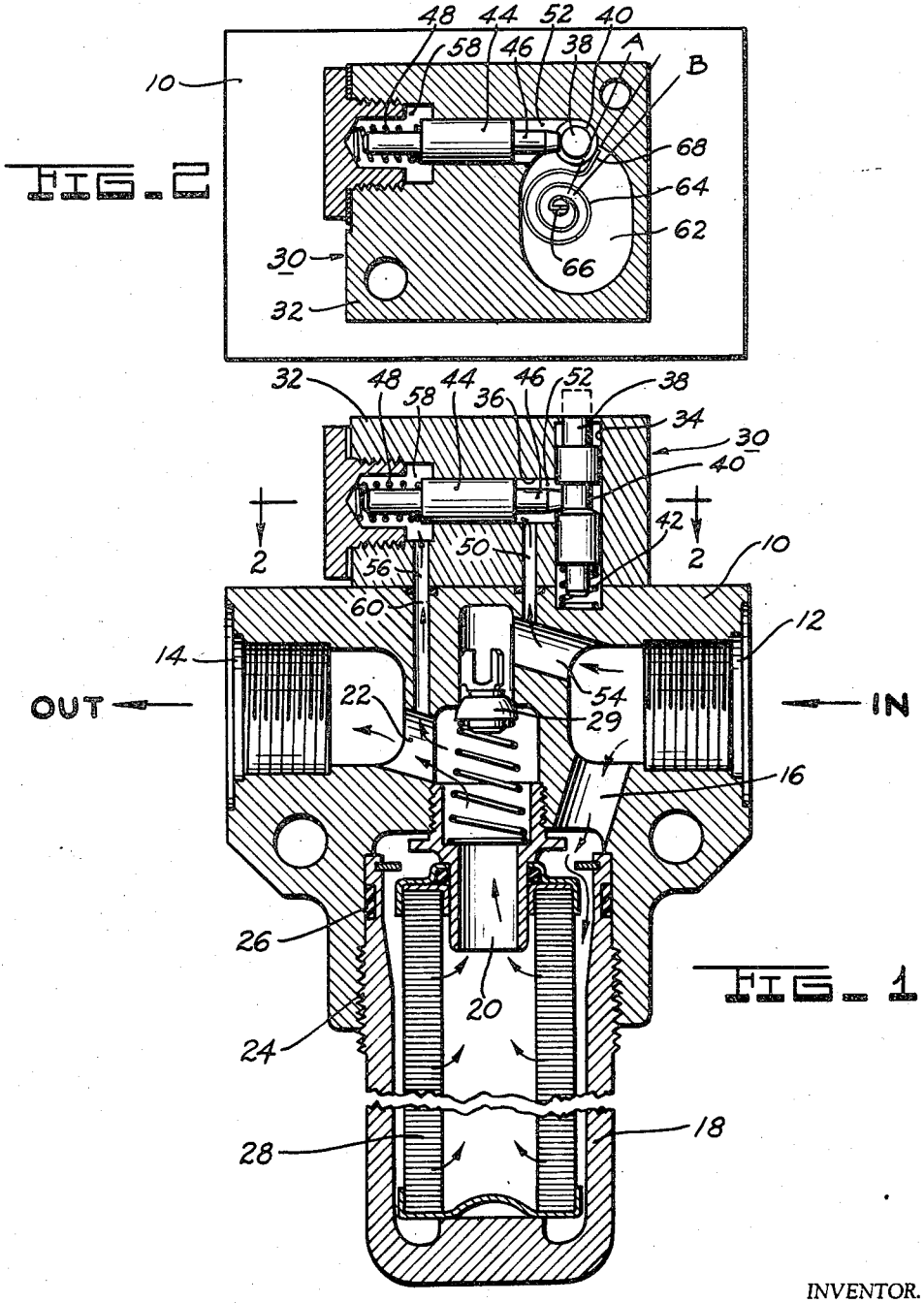

Robert N. Steensen, Royal Oak, Mich., assignor to Bendix Aviation Corporation, South Bend, Ind., a corporation of Delaware Application December 9, 1957, Serial No. 701,479

9 Claims. (Cl. 116—117)

This invention relates to a visible filter clogging indicator and more specifically to a temperature regulated differential pressure indicating device.

The use of various types of differential pressure indicating devices, which sense changes in the pressure drop across a filter element when it becomes clogged, has long been known in the art. One of the faults, however, of many of these devices has been the fact that no regulating means has been included, therewith, for preventing the indicator from indicating a clogged filter condition at low abnormal temperatures when the fluid filtered would normally have a high voscosity. Consequently, a false indicator reading would result.

It is, therefore, one of the objects of this invention to provide a differential pressure indicating device which will indicate a given differential pressure only at temperatures above a predetermined value.

Another object of this invention is to provide an indicator which will continue to indicate the clogged condition of the filter even after the apparatus with which the filter is associated has ceased to operate.

A further object of this invention to provide a readily observable temperature regulated differential pressure indicating device which may be easily and inexpensively fabricated.

The above and other objects and features of the invention will become apparent from the following description of the mechanism taken in connection with the accompanying drawing which forms a part of this specification and in which:

Figure 1 is a sectional view of a filter unit and my visible filter clogging indicator attached thereto; and Figure 2 is a sectional view taken along line 2—2 of Figure 1.

Referring to Figures 1 and 2, numeral 10 indicates a filter head having an inlet port 12 and an outlet port 14 which communicate with each other via passage 16, fluid bowl 18, and passages 20 and 22 respectively. The bowl is secured in place to the lower side of head 10 by screw threads 24 and is sealed thereto in fluid tight relationship by an O-ring gasket 26 in an annular groove. A suitable filter element 28 is disposed in the fluid bowl in such a manner that fluid flowing between the inlet port 12 and outlet port 14 will flow therethrough as indicated by the arrows. A fluid by-pass valve 29 may be provided in the filter head to permit the fluid to pass directly from inlet port 12 to outlet port 14 when the filter element 28 becomes clogged with foreign matter to such an extent that fluid flow therethrough is seriously restricted. Brackets (not shown) may be provided for mounting the device on an engine or other mechanism.

Attached to the filter head 10 by suitable means is a filter clogging indicator 30. The indicator is comprised of a housing 32 having a first bore 34 and a second bore 36. An indicator element 38, having a sear slot 40 formed thereon, is located in first bore 34 and is movable from a hidden first position to a visible second position through means of a spring 42. Located within the second bore 36 is a piston member 44 having an extension 46 which is insertable in sear slot 40, said piston and extension being urged toward indicator element 38 by spring 48. Indicator port 50 communicates piston chamber 52 with inlet port 12 of the filter head via passage 54, while indicator port 56 communicates piston chamber 58 with outlet port 14 of the filter head via passage 60, so that the opposite sides of piston member 44 are subjected to the pressures on the inlet and outlet sides of filter element 28. A temperature sensing mechanism is located in chamber 62 adjacent indicator element 38 and includes a coiled bimetallic element 64 having one end fixed to the housing 32 at point 66 and another end in the form of an extension 68 which is movable into and out of sear slot 40 of indicator element 38.

Operation of the device is as follows: Flow through the filtering device, as indicated by the arrows in Figure 1, is from inlet port 12 through filter element 28 and out through outlet port 14. The pressures at the inlet and outlet ports are conveyed to opposite sides of piston member 44 by indicator ports 50 and 56 respectively. Since the areas on both sides of the piston member are substantially equal, the piston member will accurately sense the differential pressure existing between the inlet and outlet ports. As long as the differential pressure between the inlet and outlet ports remains below a predetermined value, determined by the spring load of spring 48, the piston member 44 will not move. However, when the differential pressure is such that the spring load can be overcome, piston member 44 will move toward the left causing extension 46 to be withdrawn from sear slot 40 of indicator element 38. Differential pressures above this predetermined value may result because of a clogged filter element or may simply result, for example, from the starting of a cold engine, at which time the flow of oil through the filter is relatively low and the viscosity of the cold oil is very high. In the second instance, although the filter would not be clogged, an indicator means controlled only by differential pressures would have indicated a clogged condition. In order to avoid such false readings, I have incorporated a temperature regulating mechanism which prevents the indicator element 38 from moving to a visible position at temperatures below a predetermined value through means of an extension 68 which is also insertable in sear slot 38. The extension 46 is inserted in the sear slot in such a manner that when a predetermined temperature is prevalent, the extension will have moved from position A within the sear slot to a non-restraining position B outside the sear slot as indicated in Figure 2.

The indicator element 38 will remain in a hidden position as long as either the extension 46 connected to piston member 44 or to the extension 68 of bimetallic element 64 is restraining it by providing interference in the sear slot of the indicator element. When both of the above mentioned extensions no longer provide any further restraint, that is, when they have moved out of the sear slot, the indicator element will move to a visible position as a result of the forces exerted thereagainst by spring 42. The indicator will remain in this visible position until it is pushed back to its hidden position ether manually or by an outside force. It will remain in this hidden position as long as either one or both of the restraining extensions 46 and 68 remain in the sear slot. When conditions are such that both restraining extensions move out of the sear slot, the indicator will again operate by moving up into the indicating position and will again remain there until reset manually or by an outside force. In this manner false clogged filter indications will be eliminated.

Although this invention has been described in connection with a specific embodiment, it is obvious to those skilled in the art that various changes may be made in the form, structure and arrangement of parts without departing from the spirit of the invention. Accordingly, applicant does not desire to be limited to the specific embodiment disclosed herein primarily for purposes of illustration, but instead desires protection falling within the scope of the appended claims.

Having thus described the various features of the invention, what I claim as new and desire to secure by Letters Patent is:

1. A filter clogging indicator comprising a housing having first and second bores therein, an indicator element located in said first bore and movable from a hidden first position to a visible second position, means urging said indicator element from said first to said second position, a piston movable in said second bore, a first port communicating with one side of said piston and one side of said filter, a second port communicating with the other side of said piston and the other side of said filter, spring means urging said piston toward said indicator element, a first member extending from said piston and operatively connected to said indicator element for preventing movement of said indicator element from said first to said second position when differential pressures across said piston remain below a predetermined value, and temperature sensing means associated with said indicator element, said temperature sensing means including a bimetallic member having an end portion extending therefrom and operatively connected to said indicator element for preventing movement of said indicator element from said first to said second position at temperatures below a predetermined value.

2. A temperature regulated differential pressure indicating device comprising a housing having first and second bores therein, an indicator pin located in said first bore, said pin having a sear slot formed thereon, spring means urging said pin from a hidden first position to a visible second position, a movable piston located in said second bore, spring means urging said piston toward said pin, a first port communicating with one side of said piston, a second port communicating with the other side of said piston, a first member connected to said piston and interposed in said sear slot for restraining movement of said pin to said second visible position, said first member being withdrawn from said slot at a predetermined differential pressure across said piston, and temperature sensing means associated with said indicator pin, said temperature sensing means including a bimetallic element having one end connected to said housing, a second member extending from the other end of said bimetallic element and interposed in said sear slot for restraining movement of said pin to said second visible position, said second member being withdrawn from said slot at a predetermined temperature.

3. A temperature regulated differential pressure indicating device comprising a housing, an indicator member located in said housing and movable from a hidden first to a visible second position, means urging said indicator member from said first to said second position, differential pressure sensing means operatively connected to said indicator member for preventing movement of said member from said first to said second position at differential pressures below a predetermined value, means urging said pressure sensing means toward said indicator member, and temperature sensing means operatively connected to said indicator member for preventing movement of said member from said first to said second position at temperatures below a predetermined value.

4. A filter clogging indicator comprising a housing having first and second bores therein, indicating means located in said first bore and movable from a non-signalling to a signalling position, means for urging said indicating means toward the signalling position, differential pressure sensing means movable in said second bore and operatively connected to said indicating means for preventing movement thereof to said signalling position when differential pressures across said pressure sensing means remain below a predetermined value, a first port communicating with one side of said pressure sensing means and one side of said filter, a second port communicating with the other side of said pressure sensing means and the other side of said filter, means for urging said pressure sensing means toward said indicating means, and temperature sensing means operatively connected to said indicating means for preventing movement thereof to said signalling position at temperatures below a predetermined value.

5. A temperature regulated differential pressure indicating device comprising a housing, a member located in said housing and movable from a non-signalling to a signalling position, means urging said member towards said signalling position, differential pressure sensing means operatively connected to said member for preventing movement thereof to said signalling position at differential pressures below a predetermined value, and temperature sensing means operatively connected to said member for preventing movement thereof to said signalling position at temperatures below a predetermined value.

6. A temperature regulated differential pressure indicating device comprising a housing, indicating means located in said housing and movable from a non-signalling to a signalling position, means urging said indicating means towards said signalling position, first restraining means operatively connected to said indicating means for preventing movement thereof to said signalling position, said first restraining means having an operative and an inoperative position and including differential pressure sensing means for causing movement of said first restraining means to an inoperative position at differential pressures above a predetermined value, and second restraining means operatively connected to said indicating means for preventing movement thereof to said signalling position, said second restraining means having an operative and an inoperative position and including temperature sensing means for causing movement of said second restraining means to an inoperative position at temperatures above a predetermined value.

7. A temperature regulated differential pressure indicating device comprising a housing, indicating means located in said housing and movable from a first to a second position, means urging said indicating means towards said second position, and first and second restraining means operatively connected to said indicating means for preventing movement thereof to said second position under predetermined conditions, said first restraining means including differential pressure sensing means for freeing said indicating means from said first restraining means at differential pressures above a predetermined value, said second restraining means including temperature sensing means for freeing said indicating means from said second restraining means at temperatures above a predetermined value.

8. A temperature regulated differential pressure indicating device comprising a housing, indicating means located in said housing and movable from a non-signalling to a signalling position, means urging said indicating means towards said signalling position, restraining means having operative and inoperative positions operatively connected to said indicating means for preventing movement thereof to said signalling position, said restraining means including differential pressure sensing means for causing movement of said restraining means to an inoperative position at differential pressures above a predetermined value, and temperature sensing means operatively connected to said indicating means for preventing movement thereof to said signalling position at temperatures below a predetermined value.

9. A temperature regulated differential pressure indicating device comprising a housing, a member located in said housing and movable from a non-signalling to a signalling position, means urging said member towards said signalling position, and means operatively connected to said member for controlling movement thereof to said signalling position, said means including differential pressure sensing means for preventing movement of said member to said signalling position at differential pressures below a predetermined value and also including temperature sensing means for preventing movement of said member to said signalling position at temperatures below a predetermined value.

References Cited in the file of this patent

UNITED STATES PATENTS

| | | |
|---|---|---|
| 2,729,339 | McCoy | Jan. 3, 1956 |
| 2,843,077 | Leefer | July 15, 1958 |